(No Model.)

A. LATCH.
MANUFACTURE OF METAL TUBES.

No. 334,531. Patented Jan. 19, 1886.

Witnesses:
Emil Herter
C. Sundgren

Inventor:
Arthur Latch
by his attorneys
Brown & Hall

UNITED STATES PATENT OFFICE.

ARTHUR LATCH, OF WESTMINSTER, COUNTY OF MIDDLESEX, ENGLAND.

MANUFACTURE OF METAL TUBES.

SPECIFICATION forming part of Letters Patent No. 334,531, dated January 19, 1886.

Application filed November 12, 1885. Serial No. 182,544. (No model.) Patented in England August 28, 1884, No. 11,743; in France April 20, 1885, No. 155,819; in Belgium April 21, 1885, and in Germany April 23, 1885, No. 3,116.

*To all whom it may concern:*

Be it known that I, ARTHUR LATCH, a subject of the Queen of Great Britain, residing at 23 Great George Street, Westminster, in the county of Middlesex, England, have invented certain new and useful Improvements in the Manufacture of Metal Tubes, (for which I have received Letters Patent in Great Britain, No. 11,743, dated August 28, 1884; in France, dated April 20, 1885, No. 155,819; in Belgium, dated April 21, 1885, and in Germany, dated April 23, 1885, No. 3,116,) of which the following is a specification.

My invention relates to improvements in the manufacture of metal tubes by twisting or combining a series of lengths, strips, or parts of metal of various sections by twisting the wires together in a machine of similar construction to that ordinarily used for forming or making wire ropes, (in this case, however, the bobbins would be fixed,) the sections of the wires being such that when so twisted to form a flexible tube they will hold together without falling apart.

Thus my improvements consist in locking or holding together a series of lengths, strips, or parts to form a flexible metal tube by twisting, so that the parts forming the outside of the flexible tube continue on the outside of its entire length, and should any individual part or strip be fractured it will still be retained in position, owing to the sectional combination of the parts.

Figure 1:
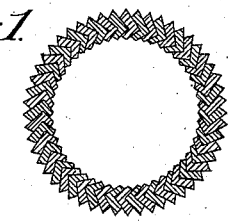
Figure 2:
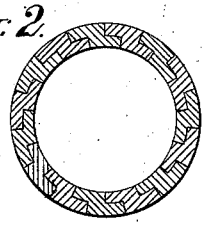
Figure 3:
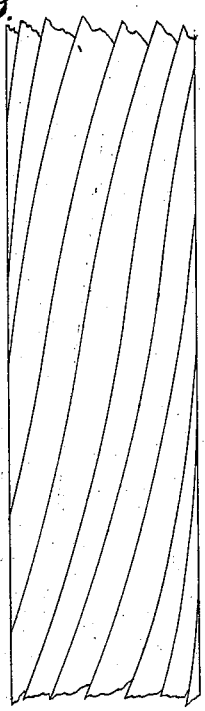

I do not confine myself to any particular section; but as examples I find it advantageous to use wires or strips of the sections shown by Figures 1 and 2 of the drawings hereto annexed, Fig. 3 being an external view of Fig. 2.

In order to render flexible tubes of this character fluid and air tight they may be coated inside or outside, or both, with any suitable material that will exclude water or air.

Having now particularly described and ascertained the nature of my said invention and in what manner the same is to be performed, I declare that what I claim is—

The improved manufacture of flexible metal tubes by twisting together a series of lengths, strips, or parts of metal of various sections in a similar manner and by similar means to that of forming or making wire ropes, (but in this case the bobbins would be fixed,) the section of each length, strip, or part forming the outside of the tube being so shaped as to interlock with those adjoining it, so that should any individual part be fractured it will still be retained in position, substantially as hereinbefore fully described.

ARTHUR LATCH.

Witnesses:
WM. SCARLETT,
    *Newcastle.*
GEO. S. H. SWAN.